United States Patent [19]

Roy et al.

[11] 4,256,808
[45] Mar. 17, 1981

[54] METHOD AND MEANS FOR REDUCING HEAT TRANSMISSION THROUGH A WINDOW

[75] Inventors: Ram B. Roy, Nyköping; Lars B. Östehsson, Trosa; Rolf B. Westin, Nyköping, all of Sweden

[73] Assignee: Studsvik Energiteknik AB, Nyköping, Sweden

[21] Appl. No.: 18,128

[22] Filed: Mar. 7, 1979

[30] Foreign Application Priority Data

Mar. 7, 1978 [SE] Sweden ............................. 7802583

[51] Int. Cl.³ .................. B32B 17/10; B32B 27/30
[52] U.S. Cl. ........................... 428/421; 52/171; 52/789; 160/238; 156/71; 156/109; 350/1.7; 428/34; 428/918; 428/920
[58] Field of Search ................ 428/34, 421, 422, 430, 428/431, 442, 918, 920; 52/171, 788, 789; 156/99, 71, 109; 350/1.1, 1.6, 1.7; 160/238

[56] References Cited

U.S. PATENT DOCUMENTS

| | | | |
|---|---|---|---|
| 4,095,013 | 6/1978 | Burger | 428/483 |
| 4,158,718 | 6/1979 | Kehl et al. | 428/920 |

*Primary Examiner*—William J. Van Balen
*Attorney, Agent, or Firm*—Burns, Doane, Swecker & Mathis

[57] ABSTRACT

A method of reducing heat transmission through a window in a heated building, in a direction from the interior of the building to the building surroundings, while simultaneously maintaining complete visibility through the window both in, as well as against said direction, characterized in that a plastics film is applied to a window pane, said film being substantially fully transparent for visible light and which has substantially reduced transparency for a wavelength range corresponding to the heat radiation from the interior of the building. The film may comprise or consist of a polyethylene terephthalate film. Possibly a transparent polyvinyl fluoride film is also arranged in the window. Alternatively, a compound film comprising a polyethylene terephthalate film and a polyvinyl fluoride film is applied to the pane. Preferably the polyethylene terephthalate film is applied nearer to the interior of the building than the polyvinyl fluoride film. A means for carrying the method into effect comprises a compound film consisting of a polyethylene-terephthalate film and a polyvinyl fluoride film, said compound film being made with dimensions corresponding to the dimensions of a window pane and arranged for attaching thereto.

8 Claims, No Drawings

METHOD AND MEANS FOR REDUCING HEAT TRANSMISSION THROUGH A WINDOW

The invention relates to a method and means for reducing heat transmission through a window in a building heated to room temperature, in a direction from the interior of the building to the surroundings thereof, while simultaneously maintaining full visibility through the window both in, and against said direction.

Conventional windows constitute a substantial heat leakage location in heated buildings. The attempts that have so far been made to reduce heat losses through a window have been mainly directed towards reducing heat losses due to convection in relation to multi-pane windows. So-called "sealed pane windows" have been made for this purpose for a long while, said windows having two or more panes, the spaces between the panes being sealed off and filled with a dry gas.

It has been found that up to as much as 70% of the heat loss through a window is traceable to heat radiation. An insulating window of the triple pane type gives such a heavy reduction of the heat losses due to convention in comparison with conventional linked casements, however, that so far one has been satisfied with utilizing sealed pane windows for reducing heat losses through a window.

Metal films have been applied to window panes with a completely different goal in mind, i.e. to prevent unintentional heating-up of the interior of the building due to incident solar radiation, primarily to reduce or eliminate the need of cooling the air in the building. It is known to apply such metal films by depositing a metal vapor on a transparent plastics film and then gluing the metal-coated plastics film against a window pane.

However, metal-coated window panes have the serious disadvantage that they do not allow visibility in both directions, and usually only allow visibility from a dark zone on one side of the window to a light zone on the other side thereof. Furthermore, such panes have a mirror effect which is unacceptable in many cases. Moreover, such panes tend to increase the overall heating requirements of the building, as the amount of solar heat energy prevented from entering the building interior may well be greater than amount of heat energy maintained in the building interior by such panes.

It is further known to apply a tough transparent film on the inside of the window with laminated glass for vehicle windscreens, the purpose of this transparent, tough film is to reinforce the glass laminate so that vehicle passengers will not be injured by glass splinters on contact with the windscreen, if the windstreen should shatter.

An object of the present invention is to provide a method for reducing heat transmission through a window in a building heated to room temperature, especially through a multi-pane window, in a direction from the interior of the building to the surroundings thereof, while simultaneously maintaining full visibility through the window both in, as well as against said direction.

The inventive object is achieved in that a plastics film is applied to a pane of the window, said film being substantially fully transparent for visible light, and having substantially reduced transparency for a wavelength range corresponding to the heat radiation from the interior of the building heated to room temperature.

A film which is well suited for this purpose is a polyethylene terephthalate commercially available under the MYLAR trademark. We have namely found that such a MYLAR film has a transmission minimum for radiation of a wavelength corresponding to the wavelength for a black body having a temperature of about 17-20° C. It is reasonable to assume that the interior of a building, i.e. the inner walls, equipment and air mass in such a building, which is heated to a temperature of between about 17° and 21° C., behaves as a black radiation body, and that the heat radiation from a building heated to such a temperature is considerably reduced by the MYLAR film. We have actually found in experiments that a MYLAR film with a thickness of 0.025 mm reduces the heat radiation through a window by the factor 2.5 at said temperature range. The thickness of the film has not been found to be critical, and the situation is probably that reflection takes place at the MYLAR film. We think it also conceivable to arrange a transparent polyvinyl fluoride film in the window as well, such film being available commercially under the TEDLAR trademark. The polyethylene phthalate film and the polyvinyl fluoride film can furthermore be put together to a compound film, so that both these materials can be simply and simultaneously fitted into the window by applying a single compound film. If it is intended, in accordance with the invention, to apply a film of the kind given in a multi-pane window, the film is suitably applied to the surface facing outwards of the pane nearest to the interior of the building. In the case of a compound film or for a MYLAR film as well as a TEDLAR film, the TEDLAR material is placed nearest to the building surroundings and the MYLAR material nearest to the building interior.

The TEDLAR film is substantially fully transparent for visible light and has a substantially reduced transmission for a wavelength range corresponding to the heat radiation from a black body having a temperature of between about 25° and 41° C., thus supplementing the MYLAR film. A further substantial advantage with using a TEDLAR film in combination with a MYLAR film in the way described is that the TEDLAR film, which normally should be UV-stabilized, cuts off the ultraviolet components of the incident solar radiation from the MYLAR film.

The means in accordance with the invention for carrying out the method comprises a compound film consisting of a MYLAR film and a TEDLAR film.

The invention can also be applied in conjunction with manufacturing so-called sealed pane windows, i.e. windows in which the space between the panes is sealed off. In this case it is conceivable to provide one of the panes, on its surface facing towards the interior space with respect to the fitted window, with a film of the kind mentioned above, before the pane or panes are sealed in a conventional manner against a peripheral spacing frame, which may contain a drying agent for taking care of possible moisture in the gas enclosed in the window.

The plastics film utilized in accordance with the invention can be applied tightly to the intended surface while utilizing the static electricity developed in handling plastics film, it being ensured that there are no air bubbles occurring between the film and pane. It is possible that the adhesion between film and pane is sufficient for keeping the film in close engagment with the pane, but if so required, the edge of the film can be sealed off against the pane or window frame with the help of adhesive tape.

What is claimed is:

1. A method of reducing heat transmission through a window in a heated building, in a direction from the interior of the building to the building surroundings, while simultaneously maintaining complete visibility through the window both in, as well as against said direction, characterized in that a plastic film is applied to a window pane, said film being substantially fully transparent for visible light and which has substantially reduced transparency for a wavelength range corresponding to the heat radiation from the interior of the building.

2. A method as claimed in claim 1, characterized in that the film comprises a polyethylene terephthalate film.

3. A method as claimed in claim 2, characterized in that a transparent polyvinyl fluoride film is also arranged in the window.

4. A method as claimed in claim 3, characterized in that a compound film comprising a polyethylene terephthalate film and a polyvinyl fluoride film is applied to the pane.

5. A method as claimed in claim 3 or 4, characterized in that the polyethylene terephthalate film is applied nearer to the interior of the building than the polyvinyl fluoride film.

6. A method as claimed in claim 1, characterized in that the window is a multi-pane window and that the film is applied to the surface of a pane facing towards the building surroundings, said pane being the one nearest to the interior of the building.

7. A method as claimed in claim 1, characterized in that the plastic film is applied to the window pane utilizing static electricity developed in handling said film.

8. A plastic film for reducing heat transmission through a window in a heated building in a direction from the interior of the building to the building surroundings, while simultaneously maintaining complete visibility through the window both in, as well as against said direction, said window having at least one window pane, and said plasic film comprising:

a first film, said first film having dimensions corresponding to the dimensions of said window pane, and said first film being adapted to be attached to said window pane; and a second film, said second film having dimensions corresponding to the dimensions of said window pane, and said second film being attached to said first film;

wherein one of said first and second films comprise a polyethylene terephthalate film, and further wherein the other of said first and second films comprises a polyvinyl fluoride film.

* * * * *